United States Patent [19]

Lovato et al.

[11] 3,913,226
[45] Oct. 21, 1975

[54] CITRUS CUTTER

[76] Inventors: Antonio R. Lovato; Victoria C. Lovato, both of 10214 San Luis Ave., South Gate, Calif. 90280

[22] Filed: July 8, 1974

[21] Appl. No.: 486,502

[52] U.S. Cl. .................................. 30/123.5; 30/356
[51] Int. Cl.² ........................................ B26B 1/00
[58] Field of Search ............ 30/113.1, 113.3, 123 R, 30/123.5, 356

[56] References Cited
UNITED STATES PATENTS

| | | | |
|---|---|---|---|
| 206,707 | 8/1878 | Doane | 30/123.5 |
| 2,022,954 | 12/1935 | Cook | 30/123.5 |
| 2,974,411 | 3/1961 | Little | 30/123.5 |
| 3,149,417 | 9/1964 | Lowry | 30/123.5 |
| 3,397,455 | 8/1968 | Egge | 30/123.5 |

FOREIGN PATENTS OR APPLICATIONS 418,097   2/1947   Italy ................................ 30/123.5

*Primary Examiner*—Al Lawrence Smith
*Assistant Examiner*—J. T. Zatarga
*Attorney, Agent, or Firm*—Antonio W. Lovato

[57] ABSTRACT

Citrus cutter handle with probe mounted thereon defines three points along an arc of citrus fruit radius with a skin cutter of limited depth positioned along the arc so that the handle and probe engage the citrus fruit along the arc to control the skin cutter.

1 Claim, 4 Drawing Figures

U.S. Patent   Oct. 21, 1975   3,913,226
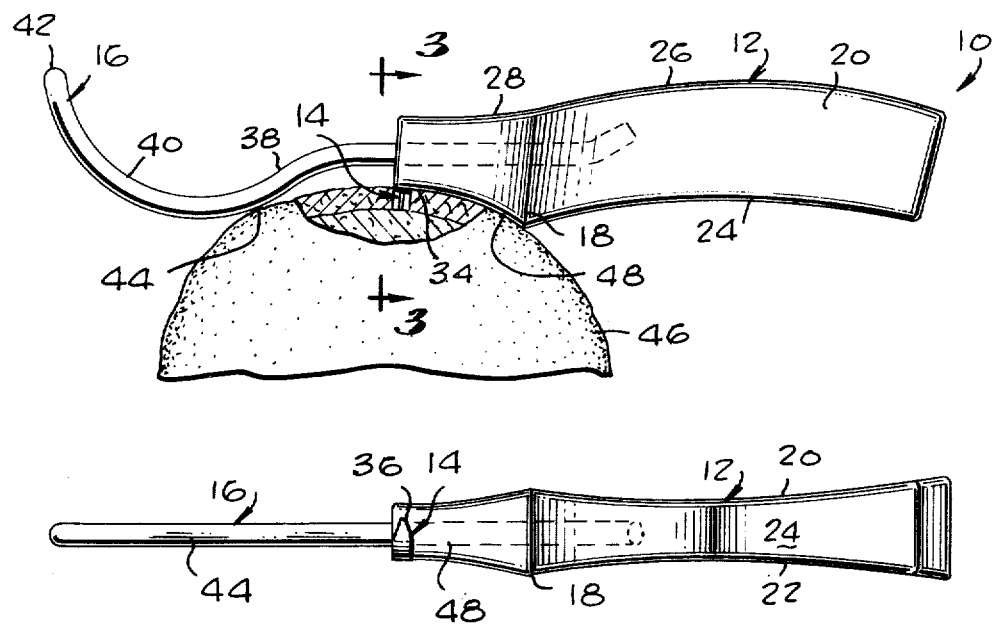
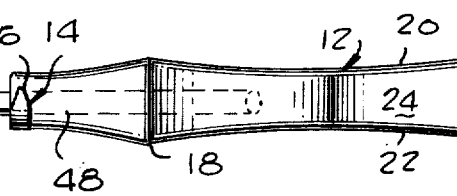
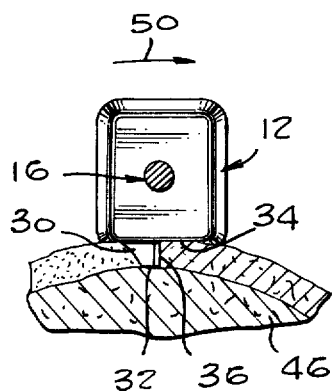
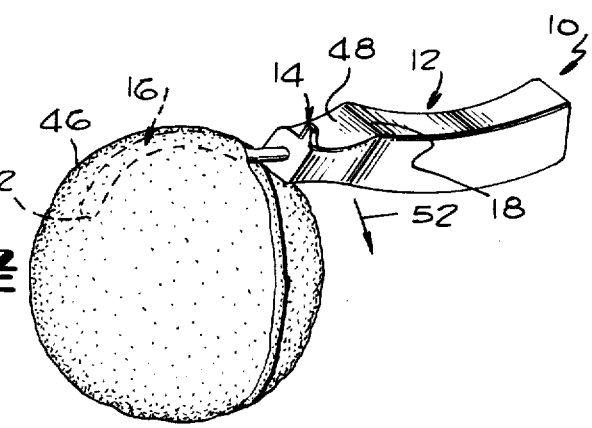

CITRUS CUTTER

BACKGROUND OF THE INVENTION

1. Field of the Invention

This invention is directed to a manual citrus cutter having both a skin cutter and a skin-loosening probe mounted on a handle.

2. Description of the Prior Art

The ordinary kitchen paring knife is the usual instrument employed in the manual peeling of citrus fruit. Oranges, lemons, and grapefruit are all citrus fruit and have a pithy skin which separates from the juice-containing interior segments without difficulty. First, the outer skin must be cut, as with a paring knife, and then the pithy inner skin must be removed from the juice-containing segments, preferably without cutting of the segments. In this way, the individual segments are freed for eating.

Specialty tools have been developed, but they have not been fully satisfactory in the control of the skin-cutting blade, because it is necessary for fully effective citrus fruit peeling that the cutter be limited to not reach the juice-containing segments. Proper bearing of the tool on the outer surface of the skin is necessary during the cutting operation in order to limit cutting depth.

SUMMARY OF THE INVENTION

In order to aid in the understanding of this invention, it can be stated in essentially summary form that it is directed to a citrus cutter which has a handle and probe, with the handle and probe having three points which define an arc which has the radius of a citrus fruit. The skin-cutting knife is positioned to extend radially inward into the arc to limit knife cutting depth so that it is properly controlled. The probe is shaped to lift the citrus skin off of the juice-containing segments.

It is thus an object of this invention to provide a citrus cutter which controls a citrus skin-cutting knife to proper depth for cutting of the skin of the citrus fruit without the cutting of the juice-containing segments therein. It is another object to provide a citrus cutter which has a skin-cutting knife and a skin-lifting probe thereon, with the probe cooperating with the knife to limit knife depth. It is a further object to provide a citrus cutter which has a handle with the knife extending to one side of the handle and with the probe operative for lifting citrus skin extending in another direction from the handle. It is a further object to provide a citrus cutter which is economical of manufacture, safe of use, and reliable in operation without requiring extensive experience in its use so that it can be extensively and conveniently employed.

The features of the present invention which are believed to be novel are set forth with particularity in the appended claims. The present invention, both as to its organization, manner of operation, and together with further objects and advantages thereof, may be understood best by reference to the following description taken in connection with the accompanying drawings.

BRIEF DESCRIPTION OF THE DRAWINGS

FIG. 1 is a side elevational view of the citrus cutter of this invention, with a portion of a citrus fruit broken away.

FIG. 2 is a view of the citrus cutter from the knife side thereof.

FIG. 3 is a section taken generally along the line 3—3 of FIG. 1.

FIG. 4 is a perspective view showing the citrus cutter in use, with its probe lifting skin from citrus fruit.

DESCRIPTION OF THE PREFERRED EMBODIMENT

The citrus cutter of this invention is generally indicated at 10 in FIGS. 1, 2, and 4. Citrus cutter 10 has three inter-related functional parts. The parts are handle 12, skin cutter 14, and peeling probe 16.

The outer end of the handle, to the right of ridge 18, as seen in FIGS. 1 and 2, has concave sides 20 and 22, preferably symmetrical about a plane lengthwise of the handle and substantially normal to the drawing as seen in FIG. 2. The outer end of the handle is manually engageable and is gracefully shaped for aesthetic appearance. The bottom 24 of the right end of the handle is concave, while the top 26 is convex, as seen in FIG. 1, to the right of ridge 18. The left end of the handle top at 28 is concave for finger engagement over cutter 14.

Cutter 14 has a body 30 which terminates in flat end 32 which extends away from the handle bottom 34 a predetermined distance. Cutter 14 is not sharp on cutter end 32 to help prevent cutting of the citrus fruit segments, but the sharp edge 36 of cutter 14 is directed sideways on citrus cutter 10. The sharp edge 36 is substantially normal to the axis lying substantially along the length of the citrus cutter and extends substantially along the plane which bisects the citrus cutter normal to FIGS. 2 and 3 and lies parallel to FIG. 1 along the center line of the cutter in FIG. 1. The sharp edge of the cutter is thus directed laterally of the cutter.

Handle bottom 34 at the end of the handle and ridge 18 on the bottom of the handle form two points of an arc. Peeling probe 16 is of circular cross section and extends into the handle from the left end, which carries the skin cutter, and is secured therein. Peeling probe 16 has a convex upward bend at 38 and then has a concave upward bend 40 and finally terminates in a rounded end 42. Bends 38 and 40 produce a contact point 44 which faces downwardly, as seen in FIG. 1, and which defines the third point together with ridge 18 and handle bottom point 34 to define an arc which has a radius substantially equal to the radius of a citrus fruit, such as fruit 46. The curvature of curved area 48 of the handle between points 18 and 34 is also substantially along this arc. Furthermore, curved area 48 is an area that extends between the sides of the handle, as well as between the contact points 18 and 34 so that a substantial handle area can come into contact with the citrus fruit. Additionally, the skin cutter 14 is substantially normal to this area at the left end thereof.

On peeling probe 16, leftward of the transition between convex bend 38 and concave bend 40, the curve of the peeling probe 16 is arcuate, preferably on substantially the same arc as curved area 48 so that it has substantially the same curvature as a citrus fruit. It should be noted that the curvature of curved area 48, while of substantially the same radius as concave bend 40, is on the opposite side of citrus cutter 10. In this way, contact point 44 can be formed as part of the bend 40 and lie on the arc defined by points 18, 34, and 44.

In use, skin cutter 14 is presented to the citrus fruit 46, as seen in FIG. 1 and 3. Manual pressing of skin cutter 14 against the outside of the skin of the citrus fruit while moving it in the forward direction of cutting, which is the direction of arrow 50 in FIG. 3, permits skin cutter 14 to penetrate the skin. Further motion of the citrus cutter with respect to the citrus slices the skin to a predetermined depth, which is the distance from cutter end 32 back to the handle bottom 34 adjacent the cutter. This depth is sufficient to substantially cut through the skin, but is preferably insufficient to cut into the juice-containing segments of the citrus. By simple manual movement in the direction of cutting of the citrus cutter 10 with respect to the citrus fruit, the skin can be severed around the fruit. Now, to loosen the pithy portion of the skin from the juice-containing segments, citrus cutter 10 is turned over and the rounded outer end 42 of peeling probe 16 is inserted through the slot formed by the cutter and is thrust through the pith outside of the juice-containing segments. Now, the citrus cutter is rotated relative to the citrus fruit, as in the direction of arrow 52 in FIG. 4, and this loosens the pithy portion of the skin from the segments. When the full rotation has taken place, that hemisphere of skin is removable; however, prior to its removal, the citrus fruit is reversed and the citrus cutter 10 is inserted under the other hemisphere of the skin so that the other hemisphere is also loosened. Now, both skin hemispheres can be manually lifted off so that only the juice-containing segments remain with a minimum of skin pith thereon.

The three contact points on the arc defined by the contact points 18, 34, and 44 in contact with the fruit during the cutting operation provide maximum control for the skin cutter as it is employed. With the skin properly cut by this control, the chance of cutting into the juice-containing segment is minimized.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

We claim:

1. A citrus cutter comprising:

a handle for manual engagement, said handle having substantial bulk and being substantially square in cross section and having a forward end, an arcuate bottom surface portion on said handle having a radius of curvature of a citrus fruit, said arcuate bottom surface terminating at said forward end of said handle, a citrus fruit skin cutter integrally formed with said handle and extending downwardly therefrom for cutting into the skin of a citrus fruit, said skin cutter being located on said arcuate bottom surface of said handle at said forward end of said handle; and a citrus fruit peeling probe consisting of a rod of circular cross section having a shank end extending rearwardly into said handle through said handle forward end for rigid mounting of said probe and extension of said probe therefrom, said probe being directed straight out from said handle and then with a downward bend and then arcuately upwardly to provide a concave bend in a direction opposite to that of said handle bottom surface for use in insertion under and peeling away of the fruit skin, said downward bend of said probe providing a forward contact point lying on the same arc as but forwardly displaced from said arcuate bottom surface of said handle, said skin cutter residing substantially midway along such arc defined by said arcuate bottom handle surface and said forward contact point whereby such skin cutting action is both limited and secure.

* * * * *